May 23, 1933.  C. J. WOLLHEIM  1,910,416
TIRE COVER
Filed Nov. 12, 1931
Fig:1
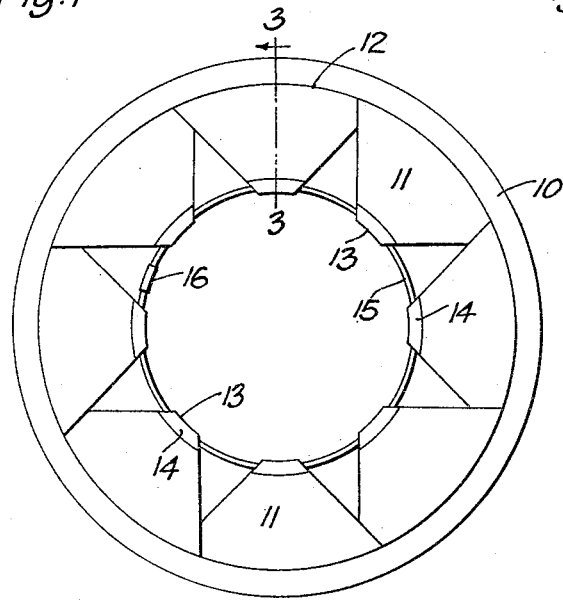
Fig:2
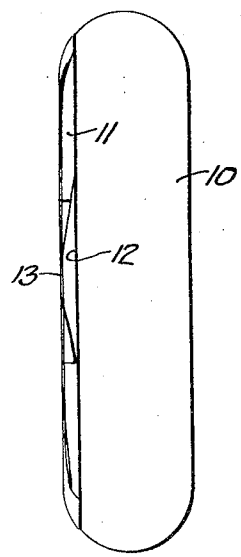
Fig:3
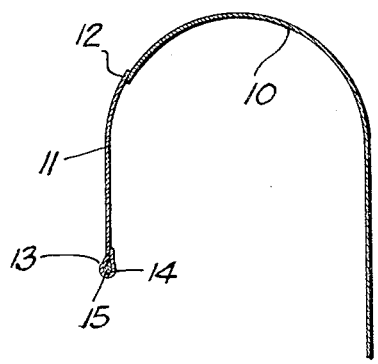
Fig:4
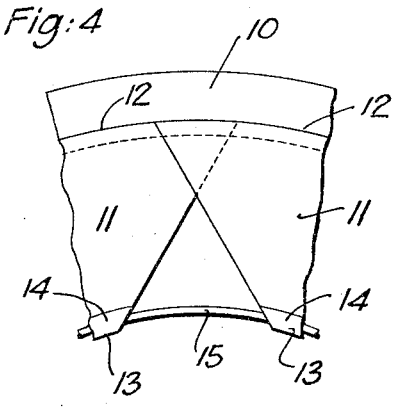
CAESAR J. WOLLHEIM
INVENTOR
BY Walter E. Wollheim
ATTORNEY Patented May 23, 1933

1,910,416

UNITED STATES PATENT OFFICE

CAESAR J. WOLLHEIM, OF CHICAGO, ILLINOIS

TIRE COVER

Application filed November 12, 1931. Serial No. 574,529.

This invention relates to improvements in tire covers. It is the particular object of the invention to provide a cover for tires of automobiles which is self adjustable so that it may be used for several sizes of tires instead of supplying individually fitted covers for the different sizes as was the custom heretofore. Another object is to make the cover of such materials that the same can readily be folded into a small parcel convenient for shipping. Still other objects will become apparent after a perusal of the following description and an examination of the accompanying drawing in which a preferred embodiment of the invention is disclosed.

In the drawing,

Fig. 1 is a rear view of the tire cover showing a preferred form of the adjustable feature;

Fig. 2 is a side view of the same;

Fig. 3 is an enlarged cross sectional view taken along the plane of line 3—3 in Fig. 1; and Fig. 4 is a fragmentary enlarged rear view of the cover showing the construction used for fastening flaps to the cover.

Like characters of reference denote similar parts throughout the several views and the following specification.

10 is a tire cover, substantially circular in shape and fitted around the sides of the tire, so as to extend over to the rear of the tire. 11 are a number of flaps of trapezoidal shape fastened with their bases 12 to the rearwardly extending circular terminal of the cover 10. Flaps 11 terminate circularly in apexes 13 which are folded over and stitched together to form loops 14. The bases 12 of flaps 11 are stitched to the cover 10 in such a way as to overlap each other at one side, as clearly shown in Fig. 4. 15 is an elastic band made of cord, coiled metal springs or other suitable means passed through loops 14 and joined together, preferably, by a coupling 16.

In using the cover, it is clearly apparent that the same can easily be drawn over a tire, the lengths of the flaps 11 being so proportioned that there will be a certain tension on the band 15 thereby forcing the cover smoothly against the tire. By virtue of the overlapping of the bases 12 of the flaps, the tire will still be covered even should the circular end of the front of the cover be positioned near the extreme periphery of the tire.

Attention is particularly drawn to the fact that all parts of the cover are flexible. This permits the cover to be folded into a small and compact package most convenient for shipping.

While the band 15 is preferably made of elastic cord, so as to be self-adjustable, it is obvious that a non-elastic cord having its ends adjustably tied together may also be used.

Moreover, while having shown the front cover as a solid sheet, it may be provided with any suitable opening to permit the showing therethrough of license plates or lamps or the like without detracting from its advantages.

While I have shown in the drawing and described in the specification a preferred embodiment of the principles of my invention, I wish it to be understood that various changes in form, proportions, minor details and combination of parts may be resorted to without departing from or sacrificing any of the advantages of the invention as defined in the appended claims.

What I claim as new, is:

1. A cover adapted to fit over fronts of different sized tires and extending over the sides thereof, flaps of trapezoidal shape fastened to the cover with their bases, each flap overlapping the adjoining flap at one side near its base only, loops at the apexes of the said flaps, and an elastic band through the said loops.

2. A cover adapted to fit over fronts of different sized tires and extending over the sides thereof, flaps of trapezoidal shape fastened to the cover with their bases, each flap overlapping the adjoining flap near its base only, leaving spaces between apexes of adjoining flaps, loops at the apexes of the said flaps, and an endless elastic band through the said loops.

Signed at Chicago, in the county of Cook and State of Illinois this 7th day of November A. D. 1931.

CAESAR J. WOLLHEIM.